United States Patent
Zampetti et al.

(10) Patent No.: US 10,231,080 B2
(45) Date of Patent: Mar. 12, 2019

(54) METHOD AND SYSTEM FOR SYNCHRONIZING BASE STATION AND ESTABLISHING LOCATION

(71) Applicant: Microsemi Frequency and Time Corporation, San Jose, CA (US)

(72) Inventors: George P. Zampetti, Livermore, CA (US); Christopher A. Reid, Hatfield (GB)

(73) Assignee: Microsemi Frequency and Time Corporation, Chandler, AZ (US)

( * ) Notice: Subject to any disclaimer, the term of this patent is extended or adjusted under 35 U.S.C. 154(b) by 0 days.

(21) Appl. No.: 15/495,180

(22) Filed: Apr. 24, 2017

(65) Prior Publication Data

US 2017/0230927 A1    Aug. 10, 2017

Related U.S. Application Data

(62) Division of application No. 14/582,147, filed on Dec. 23, 2014, now Pat. No. 9,635,501.

(60) Provisional application No. 61/920,176, filed on Dec. 23, 2013.

(51) Int. Cl.
*H04W 56/00*    (2009.01)
*H04W 4/021*   (2018.01)
*H04W 64/00*   (2009.01)

(52) U.S. Cl.
CPC ....... *H04W 4/021* (2013.01); *H04W 56/0035* (2013.01); *H04W 64/003* (2013.01)

(58) Field of Classification Search
CPC ... H04W 4/021; H04W 56/002; H04B 7/1851
See application file for complete search history.

(56) References Cited

U.S. PATENT DOCUMENTS

| | | | |
|---|---|---|---|
| 6,865,218 B1 * | 3/2005 | Sourour | H04B 1/7117 370/342 |
| 8,072,372 B2 * | 12/2011 | Nagahara | G01S 19/22 342/357.25 |
| 2004/0190657 A1 * | 9/2004 | Seki | H04B 7/01 375/347 |
| 2006/0064244 A1 | 3/2006 | Robbins | |

(Continued)

*Primary Examiner* — Jamal Javaid
(74) *Attorney, Agent, or Firm* — Glass & Associates; Kenneth Glass

(57) ABSTRACT

With the increasing usage of mobile devices for communication, the need for wireless base-stations deployed in strategic locations is becoming increasingly important. The increased bandwidths being transmitted between the base-station and the mobile device has mandated that enhanced transmission formats and techniques be deployed, and, in order to operate correctly, these techniques require a tight synchronization in both time/phase, and in frequency, between the various base-stations serving a general area. Due to the need to establish the geographic location of the mobile device with a high degree of accuracy, it is also necessary to establish the location of the serving base-stations with a high degree of accuracy. The invention disclosed herein provides robust and practical methods for synchronizing base-stations, as well as providing for accurate location, by leveraging the usage of global navigation satellite systems receivers in conjunction with network based schemes for packet-based (time/phase/frequency) synchronization.

19 Claims, 8 Drawing Sheets

(56) References Cited

U.S. PATENT DOCUMENTS

2013/0203437 A1\* 8/2013 Whelan .................. G01S 19/05
                                                    455/456.1
2014/0184441 A1\* 7/2014 Hwu ....................... G01S 19/41
                                                    342/357.24

\* cited by examiner

METHOD AND SYSTEM FOR SYNCHRONIZING BASE STATION AND ESTABLISHING LOCATION

CROSS-REFERENCE TO RELATED APPLICATIONS

This application is a divisional application of co-pending U.S. patent application Ser. No. 14/582,147, filed Jan. Dec. 23, 2014 and entitled "Method and System for Synchronizing Base Station and Establishing Location," which is based upon and claims the benefit of U.S. Provisional Patent Application No. 61/920,176, filed on Dec. 23, 2013, the entire contents of each of which are incorporated by reference herein.

BACKGROUND OF THE INVENTION

Description of the Related Art

With the increasing usage of mobile devices for communication, the need for wireless base-stations deployed in strategic locations is becoming increasingly important. Such base-stations are often referred to as "small cells" since they cover a limited geographic area and are often, but not always, paired with a "macro cell" that involves a base-station with much larger geographic coverage. The increased bandwidth being transmitted between the base-station and the mobile device has mandated that enhanced transmission formats and techniques be deployed, and, in order to operate correctly, these techniques require a tight synchronization in both time/phase, and frequency, between the various base-stations serving a general area.

The need for providing emergency services (also referred to in the USA as E-911) has mandated that the geographic location of the mobile device signaling an emergency be established to a high degree of accuracy. In order to universally achieve this location accuracy, it is necessary to establish the location of the serving base-stations to a high degree of accuracy.

The use of GNSS for providing location and time at a receiver is known. The most common GNSS in use is the Global Positioning Satellite (GPS) system. The use of navigational satellites to establish the position and time in a receiver is briefly explained with reference to panel A of FIG. 1. For specificity, the satellite constellation considered is GPS.

As shown in FIG. 1, the receiver (REC) 110 can establish its position and time by observing 4 satellite vehicles (SVs) denoted in FIG. 1 as SV-1 121, SV-2 122, SV-3 123, and SV-4 124. Each SV is broadcasting a signal that includes suitable time markers and messages indicating the time at the marker. At any particular point in time, t, the four satellite vehicles are at a particular distance (range) from the receiver 110. In FIG. 1 the actual range of the four satellite vehicles is denoted by $R_1(t)$ 131, $R_2(t)$ 132, $R_3(t)$ 133, and $R_4(t)$ 134. The range can be expressed either in terms of distance (e.g., meters) or in terms of time (e.g., seconds). Here we assume that the range is in terms of time because a time formulation permits the inclusion of correction terms related to effects of the ionosphere. The relationship between time and distance follows the speed of propagation of the radio signal, essentially the speed of light (nominally $3 \times 10^8$ m/s).

Denote the time offset of the receiver clock as $\delta$. The receiver estimates the range from SV-k by establishing the time-of-arrival of the time marker event contained in the broadcast signal from SV-k. This time-of-arrival is based on the receiver clock. The range estimate, $PR_k$, is called "pseudo-range" because of the receiver time offset. Thus at some point in time, T, the receiver has four range estimates, $\{PR_k(T); k=1,2,3,4\}$. Since, in principle, the location in space of the four satellite vehicles is known, the receiver can develop a set of four simultaneous equations and solve for the four unknowns corresponding to position $(x_R, y_R, z_R)$ of the receiver and $\delta$, the receiver clock offset (relative to the satellite timescale).

Packet-Based Methods for Time/Phase/Frequency Synchronization

The distribution of time over packet networks is now ubiquitous. The dominant method is the use of Network Timing Protocol (NTP) for support of general timing applications in general computing applications. However, these implementations, based on existing standards and conventions, are suitable for time alignments on the order of (several) milliseconds. Over the last decade, a new protocol, Precision Timing Protocol (PTP) has emerged supported by industry standards (IEEE 1588v2, ITU G.827x series). The key differentiator between NTP and PTP is the levels of precision obtainable with PTP can support the needs of a variety of new applications and services. Both PTP and NTP are protocols for exchanging time-stamps associated with time-of-arrival and time-of-departure of designated packets and are thus, in principle if not practice, capable of similar performance levels.

Combined Methods for Synchronization

U.S. Patent Application Publication 2014/0192826, entitled "UNIVERSAL ASYMMETRY CORRECTION FOR PACKET TIMING PROTOCOLS" provides methods for utilizing both GPS/GNSS methods and packet-based methods in a collaborative manner to provide a robust scheme for distributing time/frequency between devices. The description of such techniques is provided in U.S. Patent Application Publication 2014/0192826, which is incorporated by reference herein in its entirety.

In all network-based synchronization schemes the single, dominant, source of time error, error that cannot be corrected by the protocol, is asymmetry. Asymmetry as considered here is the difference in transit delay of the designated event packets in the two directions between the communicating clocks. Whereas packet delay variation is an expected phenomenon in packet networks and contributes to asymmetry, there is an underlying asymmetry component that is entirely independent of the network loading and depends substantively only on the path between the clocks. The path, as considered here, includes all transmission links, including multiplexers and signal-format converters and transmission media, and intermediate network elements, such as switches and routers, between the communicating clocks.

One approach known in the art that provides both time and frequency alignment involves computing an aligned time signal based on a master timing signal from a primary reference clock, such as a GNSS satellite timing signal, which is held in precise alignment with a global clock reference. This is depicted in panel B of FIG. 1.

The two clocks, CLOCK-1 110 and CLOCK-2 120 both receive timing signals 130 from the GNSS system 150. By aligning themselves to the GNSS timescale, the two clocks are, albeit indirectly, aligned to each other. Using GPS signals or other master timing signals at each network element to achieve time or frequency alignment is generally prohibitively expensive and requires each network element to be able to receive satellite time signals from GPS satellites. There are many situations where visibility of GPS satellites may be compromised, interfered with, or interrupted. It is generally accepted that, whereas GPS is a reliable and robust system, in many installations the visibility of a sufficient number of satellites simultaneously may not be available continuously.

As described in U.S. Patent Application Publication 2014/0192826, the two clocks 110 and 120 can ascertain the network asymmetry between them by first aligning themselves to the common GNSS timescale. This enables the clocks to synchronize themselves when the GNSS signal is compromised, interfered with, or interrupted.

SUMMARY OF INVENTION

Embodiments disclosed provide robust and practical methods for synchronizing base-stations ("small cells" and "macro cells") as well as providing for accurate location. Some embodiments leverage the usage of global navigation satellite systems (GNSS) receivers in conjunction with network based schemes for packet-based (time/phase/frequency) synchronization.

We assume that the receiver is (nominally) fixed in position. By repeatedly developing range estimates and solving for location/time-offset, the receiver can mitigate the impact of noise associated with (range) measurement and clock noise in the receiver clock subsystem.

Very often the receiver has multiple, possibly more than four, satellites in view and can develop pseudo-range estimates to more than 4 satellites. This results in more than 4 equations and this permits the application of mathematical techniques for noise mitigation.

This disclosure describes several additional methods for developing multiple equations, the premise being that having an "over-determined" set of equations (more equations than unknowns) enables the use of known mathematical tools for minimizing the impact of measurement and/or clock errors.

One of the enabling items is that the different receivers/clocks can be operated in a collaborative manner and thereby certain measurements that have significant error can be detected and not used in the solution.

Another one of the enabling items is that the different clocks can syntonize (i.e. synchronize in terms of frequency) themselves and thus have a common frequency-base. This syntonization is achieved using packet-based methods over the network. This permits the group of clocks to be syntonized (frequency alignment) using packet-based methods (PTP) and synchronized (time alignment) using GNSS or PTP.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

The Urban Canyon Effect

One of the important considerations in deploying small cells with GPS receivers is the "urban canyon effect". In an ideal situation, the receiver would have a good view of the sky and thereby have a direct line-of-sight path to the satellites. In some cases the receiver antenna is not mounted with a clear view of the sky. For example, the antenna may be mounted on the side of a building and the building may thus appear as an obstruction. This is depicted in FIG. 2.

Figure 1:
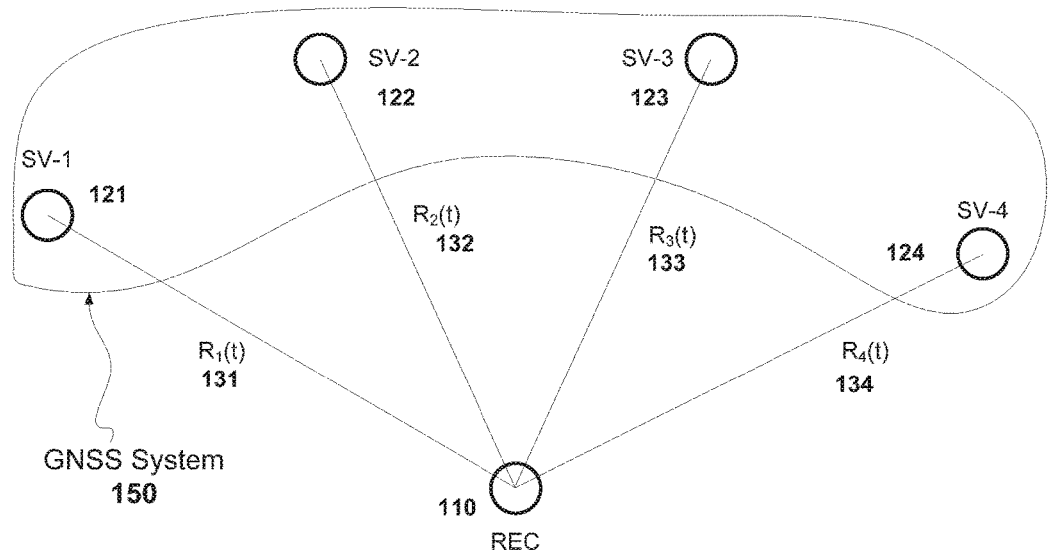
FIG. 1 depicts the notion of a receiver obtaining its time and frequency from the GNSS system and the notion of two devices synchronizing with each other by simultaneously obtaining time and frequency from the same navigational satellite system.
Figure 1:
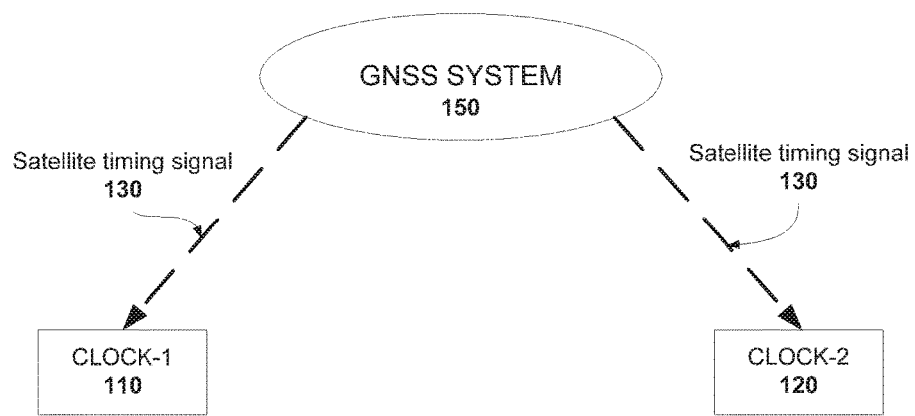
Figure 2:
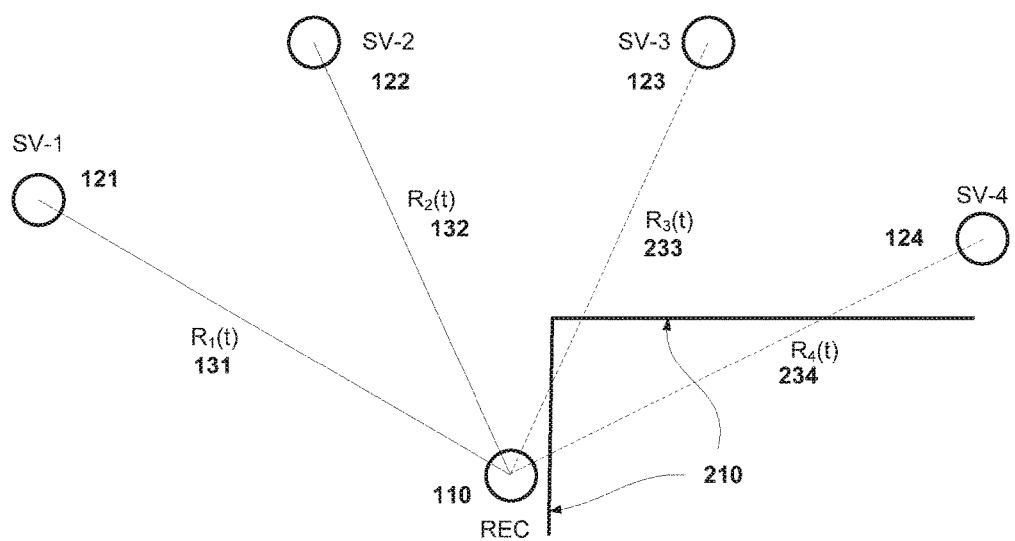
FIG. 2 depicts how, depending on the mounting location of the GNSS antenna, part of the sky may be obscured.

As shown in FIG. 2, the receiver 110 may be on the side of a building 210 that could obstruct the view of some satellites. In FIG. 2, the building 210 obstructs the view of satellites SV-3 and SV-4 at time t. This obstruction is indicated by the range vectors $R_3(t)$ 233 and $R_4(t)$ 234 being depicted with dashed lines. As shown, the receiver 110 can observe the signals from SV-1 121 and SV-2 122. Consequently the receiver 110 can make only 2 pseudo-range estimates. The two equations developed are insufficient to evaluate four unknowns, namely position (x,y,z) and time-offset ($\delta$).

In practice, if the receiver antenna is fixed then the position may be known and, further, can be assumed to be "constant". If this is a valid assumption then even though the receiver can observe just two satellites, there is only one unknown, namely time-offset and this can be estimated provided that there is at least one satellite in view. When the primary utility of the receiver is to establish time and frequency, such obstruction can be considered relatively benign if the position of the receiver has been accurately established.

In the simple configuration of FIG. 2, exemplifying cases where the receiver antenna is mounted on the side of a building, the receiver has view of about one-half of the sky, assuming that the building depicted by its outline 210 is impermeable to the radio frequency (RF) signal. Depending on the orbit of a particular satellite vehicle, it is possible that the satellite is observable for much less of the time as compared to the case where there is no obstruction.

In cases where the receiver antenna is mounted on the side of a building in an urban environment, there can be situations of multipath. This is depicted in FIG. 3.

Figure 3:
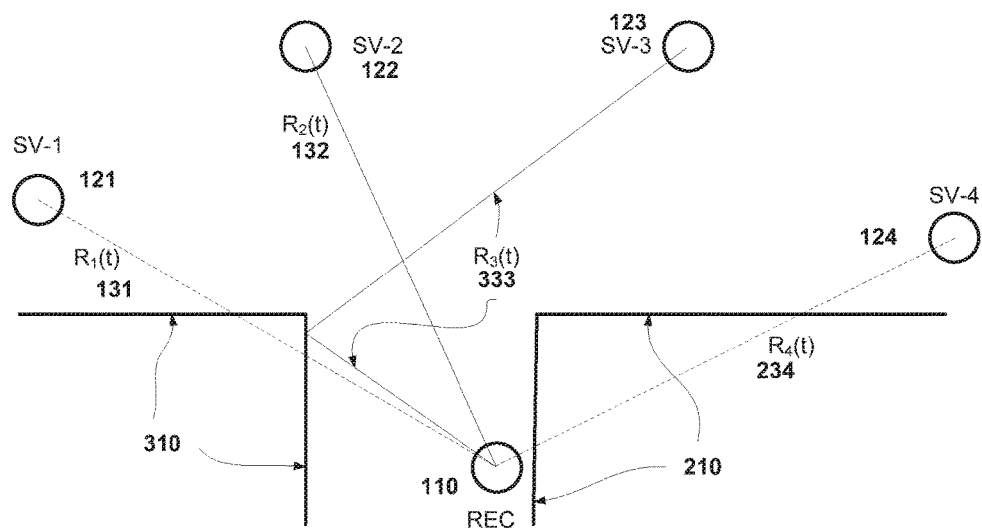
FIG. 3 depicts the urban canyon effect wherein part of the sky may be obscured and satellites in some parts of the sky may be visible via a non-line-of-sight or multipath signal.

Of particular importance in FIG. 3 is the impact of obstruction 310 that may block the signal from the position of SV-1. It can result in reflections as well as blockage. In particular, FIG. 3 indicates the path 333 that the signal from SV-3 can take to reach the receiver 110. Instead of being blocked from view, the receiver sees SV-3 over a path that is longer than line-of-sight. This is the impact of multipath. Multipath is thus the phenomenon whereby signal from a satellite arrives at the receiver but along a path that is other than line-of-sight and thereby provides an incorrect estimate of the true range, the estimate being greater than the estimate provided by the direct path.

Whereas the examples given above assume that the satellite constellation at a particular time instant is considered, a similar example can be generated by considering a particular satellite vehicle, say SV-N, as it traverses its orbit. There may be particular times when the satellite is clearly visible, other times when the satellite vehicle is blocked, and yet other times when the satellite signal arrives at the receiver via a non-line-of-sight path (multipath). An example of this situation is depicted in FIG. 4.

Figure 4:
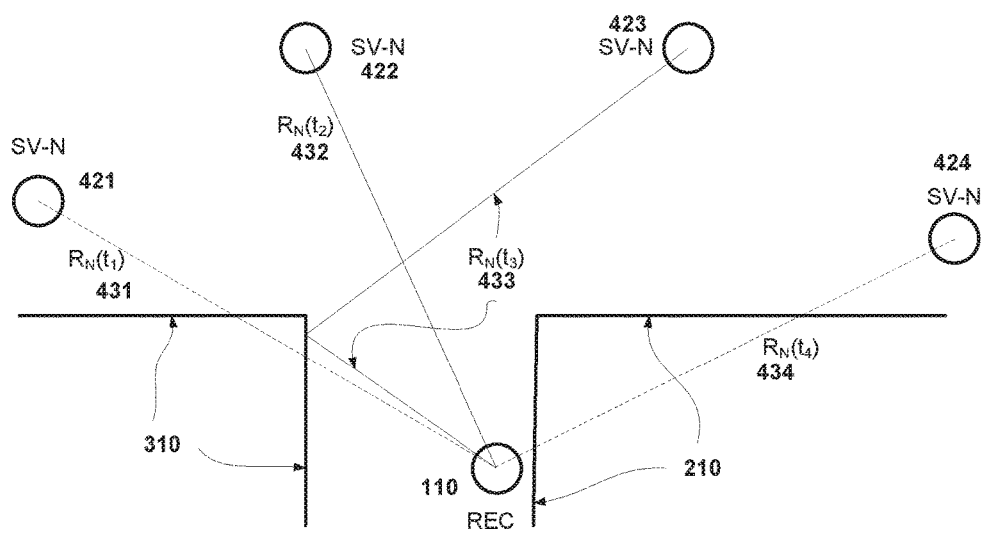
FIG. 4 depicts the case of multipath associated with a particular satellite vehicle as it traverses the sky.

As depicted in FIG. 4, one satellite, namely SV-N, is present at several different locations in the sky at different times. At time t1, satellite SV-N is at location 421 and the range is $R_N(t_1)$ 431, depicted as a dashed line to point out that the satellite SV-N may be obscured by obstruction 310. From location 422, the range $R_N(t_2)$ 432 is representative of line-of-sight. From location 423, the range $R_N(t_3)$ 433 is not representative of line-of-sight transmission but is observed via a reflected ray. At location 424, the signal is obscured by obstruction 210.

Of particular significance is the situation where there may be two GPS receivers that are in relatively close geographical proximity. This provides the opportunity to utilize the two receivers operating in a collaborative manner in order to mitigate the impact of multipath, which is depicted in FIG. 5.

Figure 5:
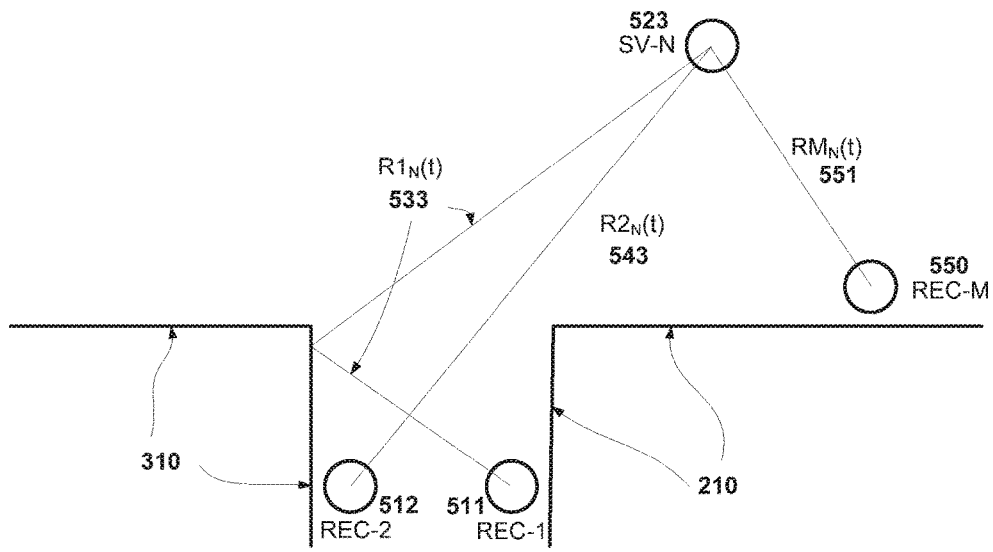
FIG. 5 depicts a situation where multipath in the case of two receivers in relatively close proximity can be detected by the receivers operating collaboratively.

In FIG. 5, there are two receivers REC-1 511 and REC-2 512 that are both receiving a signal from SV-N that is at position 523 in the sky. The path to REC-2 512 is a line-of-sight path 543, whereas the path to REC-1 511 is a non-line-of-sight path 533. The benefit of detecting the multipath nature is that REC-1 511 can account for that in its solution for time (and location).

In addition, FIG. 5 depicts another GPS receiver REC-M 550 located such that it is reasonably close to REC-1 511 (and REC-2 512) but has a clear view of the sky, particularly for satellite SV-N 523. This situation is common in base-station deployments wherein the "macro-cell" is generally the large base-station that is deployed to support a wide geographical area and engineered such that it has an unobstructed view of the sky. For improving coverage and additional traffic, several "small cells" are deployed in the general area but it may not be feasible to provide each small cell unobstructed sky view. The small cells and macro-cell collaborate to provide suitable wireless coverage and can also collaborate to improve location/timing performance as described herein. Generally the device with the best sky view is the Master clock of the collection and the other devices function as Slave clocks.

Estimating Range

Figure 6:
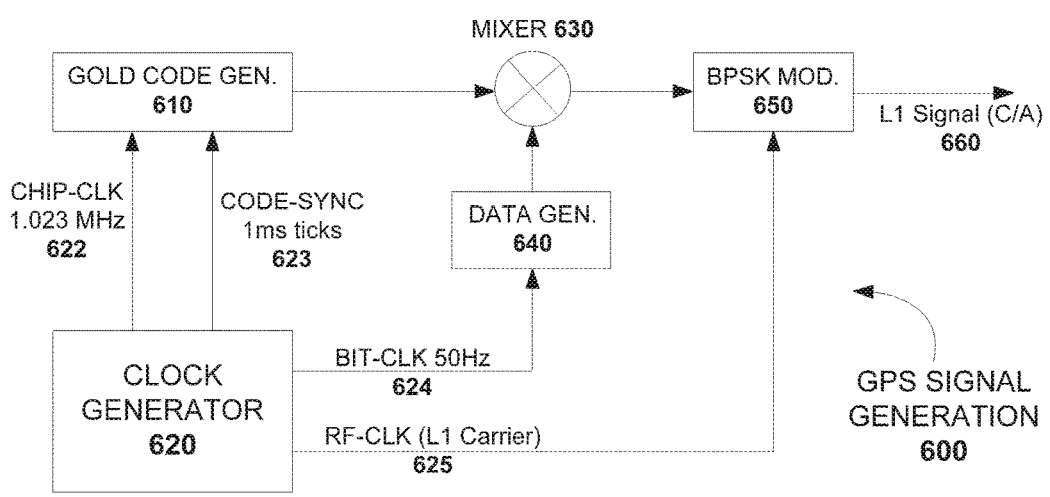
FIG. 6 provides a simplified block diagram depicting the generation of the GPS L1 signal.

The GPS signal structure is based on direct sequence spread spectrum modulation. The principal features of the GPS transmit signal are shown in FIG. 6 by way of a simplified block diagram indicating the manner in which the GPS signal is constructed.

Each satellite vehicle has a designated spreading code from a collection of Gold codes. The chip-rate used for the direct sequence spreading is 1023 kHz so that there are exactly 1023 chips in a period of 1 ms. The chosen Gold codes have a period of 1023 chips so that the period of the Gold code in time is 1 ms. The information bit rate is 50 b/s so that there are 20 Gold code periods per information bit.

The clock generator 620 provides the clocking information to generate the Gold code at the correct rate via the CHIP-CLK 622 and the 1 ms period definition via CODE-SYNC 623 and the bit-clock BIT-CLK 624 to the information generator DATA GEN 640. The direct sequence spreading is achieved by the mixer 630. The composite (spread-spectrum) signal at the chip rate is applied to a BPSK (binary phase shift keying) modulator 650 and the appropriate L1 carrier signal RF-CLK 625 to establish the composite RF signal 660. It should be noted that this is the C/A signal defined in the GPS specifications.

Figure 7:
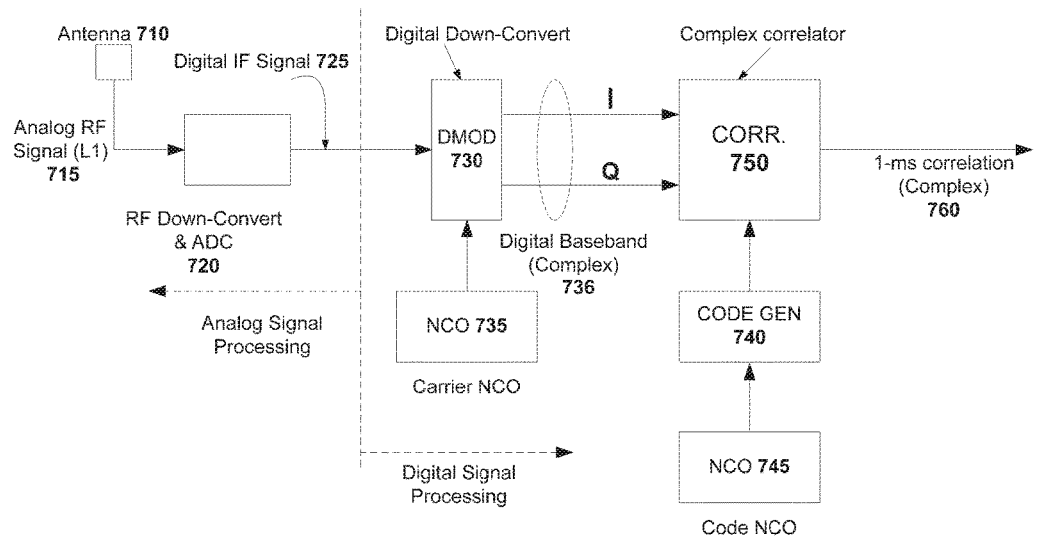
FIG. 7 provides a simplified block diagram of the GPS correlation receiver.

A simplified block diagram of the receiver section that detects the presence of the signal from the particular satellite vehicle and estimates the effective time delay and thereby the "pseudo-range" to the particular satellite vehicle is depicted in FIG. 7. The basis of the receiver is the correlation operation whereby the incoming signal is applied to a "matched filter" that is matched to the particular spreading code of the particular satellite vehicle.

The antenna 710 receives the RF signal from the air and this is down-converted to a suitable intermediate frequency (IF) signal. This IF signal is converted into digital format using an analog-to-digital converter (ADC) to create a digital IF signal 725. The down-conversion and ADC is depicted as block 720.

The digital IF signal 725 is further demodulated to base-band using digital means with a Numerically Controlled Oscillator (NCO) 735. This approach permits Doppler effect related to satellite motion to be addressed. The demodulation is done in both in-phase and quadrature to create a complex baseband signal 736 that is fed to the complex correlator 750. The other leg of the correlator 750 is provided with the reference Gold code for this particular satellite vehicle being searched/tracked. The code generator 740 develops the chip pattern against which the incoming RF signal, in the form of the complex baseband signal 736, is compared. It is well known that the correlation operation is associated with the matched filter, and this operation provides the best signal-to-noise ratio for ascertaining whether the satellite vehicle is being detected/tracked. The NCO 745 serves as the code NCO and is adjusted to provide the code at the appropriate phasing.

Figure 8:
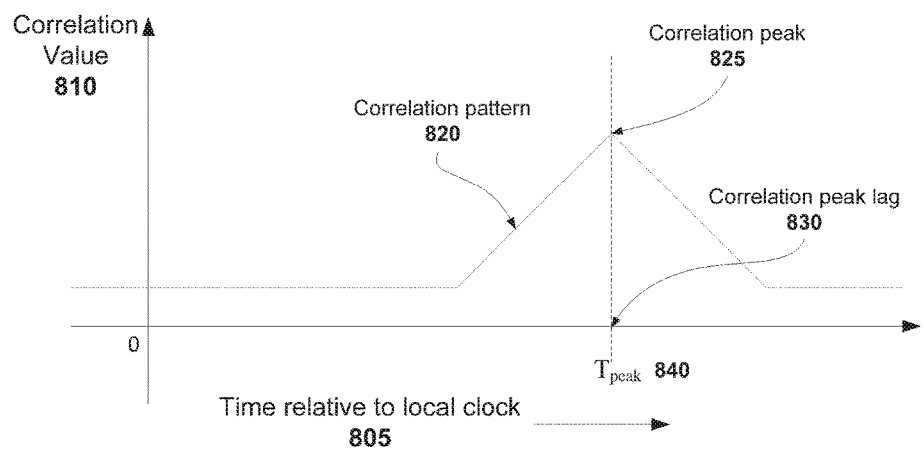
FIG. 8 illustrates the correlation pattern computed via the correlation block.

Provided the signal from the satellite under observation is present, the correlator 750 may provide information such as that depicted in FIG. 8. The correlation pattern 820 is developed by the correlator 750 which computes the correlation over 1 ms between the received signal 736 and a local replica of the code developed by code generator 740 for different time lags. The correlation pattern 820 represents the magnitude of the correlation. The receiver estimates the time lag $T_{peak}$ 840 by picking the peak value 825 of the correlation pattern. This time lag corresponds to the receiver's estimate of the distance (range), expressed in time units, between the receiver and the satellite. Since there may be an offset in the local receiver clock, this range estimate is referred to as "pseudorange".

The pseudorange and true range are related by the equation:

$$PR(t)=R(t)+\delta(t) \tag{Eq. 1}$$

where PR(t) is the pseudorange, R(t) is the actual range, and δ(t) is the receiver clock offset. Depending on the convention used, the + sign in the right-hand-side of (Eq. 1) may be changed to a − sign.

In practice, the estimate may be corrupted by multipath and, further and noise in the correlation estimate. Consequently, the actual estimate of pseudorange is related to the other terms as shown in (Eq. 2):

$$\widehat{PR}(t)=R(t)+\delta(t)+m(t)+\varepsilon(t) \tag{Eq. 2}$$

In (Eq. 2) the pseudorange estimate is affected not just by the local clock offset, δ(t); but also the impact of multipath, m(t); and possible error introduced by noise that introduces an apparent shift of the correlation peak, ε(t). If the error introduced by multipath is significant, then the location/time solution will have error in both position and time. Further, note that the multipath error is always positive (or always negative depending on the prevailing convention) and therefore conventional noise mitigation techniques such as averaging are not very useful.

In some instances position is known to a reasonable accuracy and time is the principal desired result from the calculation. Since, in principle, only one equation is required and additional equations serve to mitigate noise (mainly the measurement noise ε(t)), it is advantageous to identify the subset of pseudoranges that are substantively free of multipath error.

Receiver Coordination

Consider the case when multiple receivers, for example REC-1 511 and REC-M 550, can collaborate and exchange information regarding the pseudorange estimate to the same satellite from the multiple receiver locations.

That is, using the subscripts 1 and M to represent the entities in the two receivers at time t=$T_1$, (Eq. 3A) represents the apparent pseudorange $PR_1$ and (Eq. 3B) provides the pseudorange for REC-M, $PR_M$:

$$\widehat{PR}_1(t)=R_1(t)+\delta_1(t)+m_1(t)+\varepsilon_1(t) \tag{Eq. 3A}$$

$$PR_M(t)=R_M(t)+\delta_M(t)+\varepsilon_M(t) \tag{Eq. 3B}$$

Since REC-M has a clear view of the sky, there is no multipath term $m_M(t)$.

Given that the two receivers are in reasonably close geographic proximity, the ranges $R_1(t)$ and $R_M(t)$ are related. Specifically, for a given general location on earth, the following limit can be established:

$$|R_M(t)-R_1(t)|\leq\rho_M \tag{Eq. 4}$$

The subscript M is used to refer to the notion that the range difference $\rho_M$ is associated with the receiver that has the clear view of the sky, although it is not necessary for one or both of the receivers to have a clear view of the sky for a relationship as expressed by (Eq. 4) to apply.

If it can be ensured that the time errors $\delta_1(t)$ and $\delta_M(t)$ are close, namely $$|\delta_M(t)-\delta_1(t)|<\varepsilon_M \tag{Eq. 5}$$

and the measurement errors $\varepsilon_1(t)$ and $\varepsilon_M(t)$ can be bounded as $$|\varepsilon_1(t)|<\varepsilon_{MAX}$$

$$|\varepsilon_M(t)|<\varepsilon_{MAX} \tag{Eq. 6}$$

then by examining the apparent pseudorange for REC-1 and the pseudorange for REC-M, it can be concluded that if $$|\widehat{PR}_1(t)-PR_M(t)|>\text{THRESHOLD}_{HI} \tag{Eq. 7}$$

then the particular pseudorange measurement is excessively corrupted by multipath. In one embodiment, the receiver may output a signal reflective of such multipath corruption. The value of $\text{THRESHOLD}_{HI}$ is related to the known, pre-determined, limit $\rho_M$ and the estimated time errors and estimated measurement errors. Furthermore, if $$|\widehat{PR}_1(t)-PR_M(t)|<\text{THRESHOLD}_{LO} \tag{Eq. 8}$$

then it is very likely that the particular pseudorange measurement is not corrupted by multipath.

Timing Collaboration

In order to utilize receiver coordination, it is necessary to coordinate the receiver clocks to a level close enough to reject multipath. As will be shown, by coordinating the clocks of the various receivers, all receiver clocks can be syntonized. This syntonization provides additional benefits as will be explained later.

Figure 9:
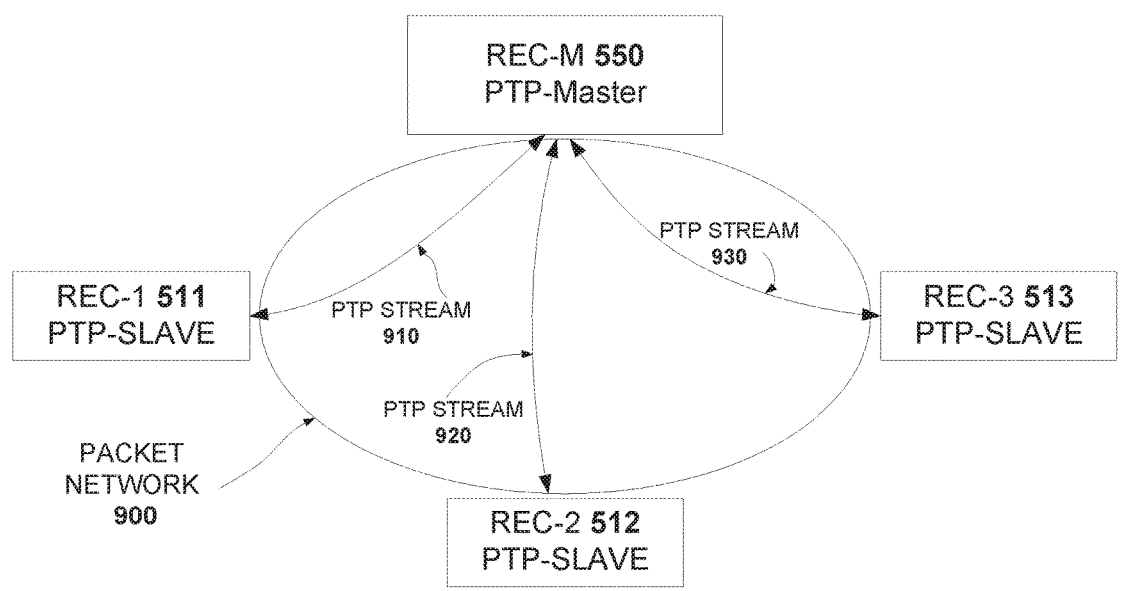
FIG. 9 depicts the situation of a collection of clocks with GNSS/GPS Receivers with one Master clock in the set.

As depicted in FIG. 9, the GPS receiver with the clear (or at least the best) view of the sky is configured as a PTP Master Clock 550 and the other GPS receivers REC-1, REC-2, and REC-3 are configured as slave clocks 511-513. These elements are interconnected over a packet network. Given the geographic proximity of the receivers (PTP clocks), the number of intervening switches between the clocks is likely to be small, typically 3 or less. PTP streams 910, 920, and 930 interconnect the slave clocks 511-513 to the master clock 550 and deliver timing references that allow the slaves to synchronize with the master.

Given that the master has a GPS receiver that has a clear view of the sky, the time-clock 550 is accurate. It is generally accepted that a clock with a good GPS receiver with a clear view of the sky can maintain time with an accuracy of better than 100 ns. That is, $|\delta_M(t)|<100$ ns. Given that the packet network interconnecting the clocks is small, the syntonization that can be achieved between the slave clocks 511-513 and the master clock 550 is excellent. That is, all the slave clocks 511-513 may have frequency offsets that are essentially negligible. The time offset between the slave clocks 511-513 and the master clock 550 is because the asymmetry of transmission paths between the clocks is unknown.

Given that the slave clocks are syntonized with the master and, further, that the master is locked to GPS, the slave clock time offset, for example of slave clock 511, $\delta_1(t)$, remains constant unless and until a correction is applied.

Figure 10:
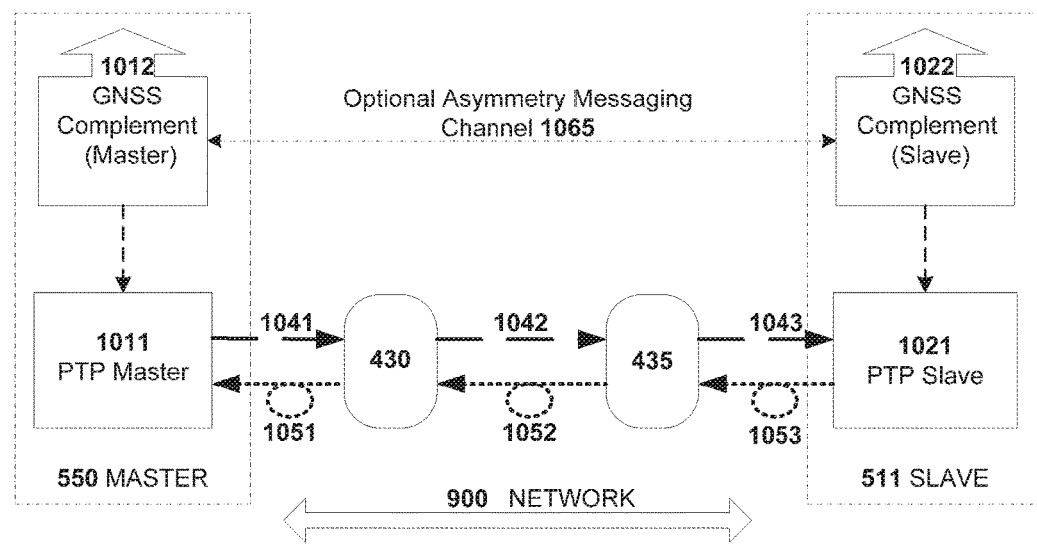
FIG. 10 identifies the case where two clock devices with GNSS/GPS receivers maintain a packet-based timing signal communication that is affected by asymmetry as well as a communication channel to pass parameters related to timing, location, and GNSS receiver signals.

The architecture is depicted in FIG. 10 showing one slave clock 511 with its associated GNSS (e.g., GPS) receiver. The intervening network between the slave clock 511 and the master clock 550 may have multiple network elements as well as multiple inter-machine transmission links. All these intervening items can introduce asymmetry.

The packet network 900 enables the establishment of a (logical) communication channel referred to as the "Optional Asymmetry Messaging Channel" 1065 that can be used to signal between the master and the slave and include information related to asymmetry as well as information regarding satellite information, particularly pseudo-range measurements, as well as the current best approximation of the geographical location. In the scenario being discussed the various receivers are assumed to be stationary and the location is, nominally, a constant.

Enhanced Algorithm for GPS Solution

These observations form the basis of the following approach to establishing and improving location estimates and time offset estimates. For purposes of explanation, the approach is described for receiver REC-1 511.

Denote the location and time offset of REC-1 511 by the quartuple $(x_1, y_1, z_1, \delta_1)$, where the location is expressed in Cartesian coordinates with respect to a suitable reference frame.

The GPS receiver REC-1 511 continually estimates the pseudorange to all visible GPS satellites. For explanatory purposes assume that these pseudorange estimates are made on a time grid $\{T_n\}$, where $T_n$ is the GPS time associated with the $n^{th}$ pseudorange measurement interval.

At time $T_n$, there may be K satellites visible that are indexed for convenience as $j_1, j_2, \ldots, j_K$. The receiver REC-1 and the master clock REC-M generate pseudorange estimates for the K satellites at time $T_n$. As mentioned before, it is possible to eliminate pseudorange measurements that are corrupted by multipath. For sake of example, assume that just one satellite pseudorange associated with satellite $j_1$ is retained. In GPS methodology, the orbital information available for the satellite vehicles provides a position $(x_{j1}, y_{j1}, z_{j1})$ for the satellite at time $T_n$.

The following equation(s) can be developed for the pseudorange between the receiver and the visible satellite(s) that are deemed to be uncorrupted by multipath (only one equation, representing j1, is shown; additional equations may be available for additional cases where multipath is minimal):

$$\left(\frac{1}{c}\right)\sqrt{(x_1 - x_{j1}(T_n))^2 + (y_1 - y_{j1}(T_n))^2 + (z_1 - z_{j1}(T_n))^2} - \delta_1 = PR_{1j1}(T_n) + \varepsilon_{1j1}(T_n) \quad \text{(Eq. 9)}$$

In (Eq. 9) the term "c" represents the speed of light, $\delta_1$ is the time offset of the clock 511 (REC-1), $PR_{1j1}(T_n)$ is the pseudorange (in time units) as computed in REC-1 for satellite vehicle j1, and $\varepsilon_{1j1}(T_n)$ represents the remaining error(s) due to measurement inaccuracies after known corrections to the range such as ionospheric corrections have been accounted for.

Over an extended period, there may be several such equations developed for distinct values of $T_n$. Of special interest is that the same satellite vehicle may be utilized more than once in the set of equations developed. This is permissible because the receivers are syntonized and therefore have a good frequency base so that $\delta_1$ does not change with time (until corrected).

There are 4 principal unknowns: $(x_1, y_1, z_1, \delta_1)$ and, consequently, there need to be at least 4 equations to establish these values. If there are only four equations then it is conventional to assume that measurement errors are "zero" and the solutions are therefore colored by the measurement errors. If there are more than 4 equations available, conventional techniques will establish a solution for these four unknowns that minimizes the impact of the measurement error. The equations are not linear equations, but there are conventional methods available to linearize the equations or to solve them using iterative methods such as the Newton-Raphson technique.

Having several equations, with satellite positions that are diverse, permits choosing a suitable subset of the equations. Given the satellite positions and the approximate location of the receiver REC-1, the chosen equations will provide the best Geometric Dilution of Precision (GDOP).

Iterative Approach to Improve Location Estimation

A collection of clocks and receivers may be considered as a self-organizing network. In particular, it is possible for the collection to detect whether a particular clock/receiver has moved.

At any given time of day, say $T_n$, the location of the satellites in space can be computed. Given the (approximate) location of two receivers, say $(x_1, y_1, z_1)$ and $(x_2, y_2, z_2)$, and a particular satellite whose location $(x_S, y_S, z_S)$ is known, the pseudo range differential can be computed and bounded (see Eq. 4). The pseudo range differential can also be measured. If the measured value of the pseudo range differential is substantively different from the computed value, then two possibilities arise. One is that the signal to one or both receivers has been corrupted by multipath and the second is that one, or both, receivers has been moved. Over the course of a day it is very likely that there will be at least some interval where the signal is not corrupted by multipath and within this interval the determination can be made whether the receiver was moved or is in its expected location. Establishing multipath may involve comparing pseudo range residuals between several receivers in the collection.

Figure 11:
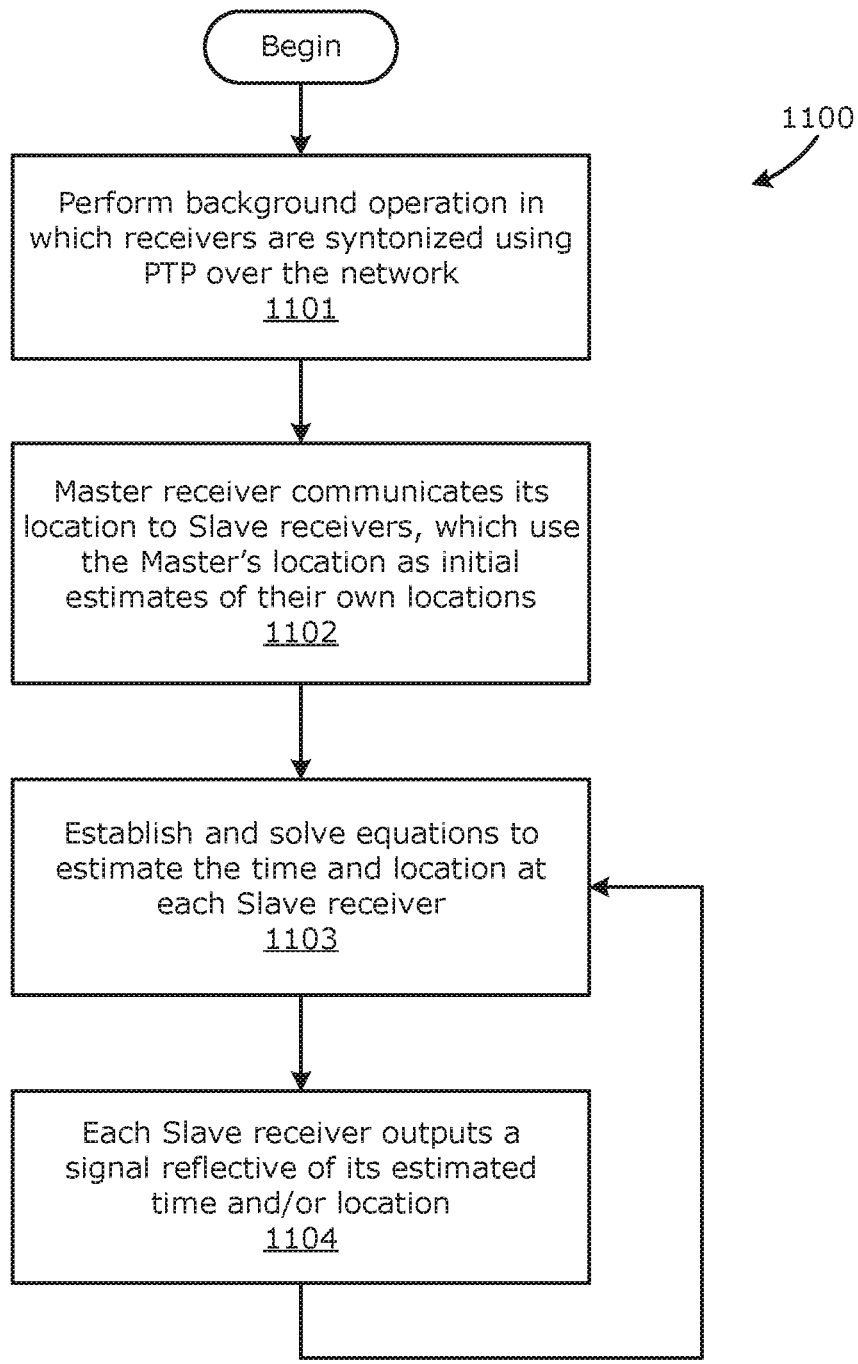
FIG. 11 depicts a method for iteratively estimating the location/time of GNSS receivers.

An iterative procedure can be used to continually improve the location/time estimates of the receivers. In one embodiment, the iterative procedure may include the steps of FIG. 11, which depicts the following method 1100 for iteratively estimating the location/time of GNSS receivers:

Step 1101 is a background operation in which the receivers are all syntonized using PTP over the network. Although depicted as a first step, it should be understood that PTP may run continually, maintaining syntonization between all the clocks. PTP is also used to estimate the time offset between the various clocks. Until asymmetry of network paths is estimated, the time offset of a particular Slave clock relative to the Master could be incorrect by the amount related to asymmetry.

At step 1102, a Master receiver communicates its location to Slave receivers, which use the Master's location as initial estimates of their own locations. One of the receivers is designated as the Master. This is generally the receiver that has the clearest view of the sky. In wireless deployments this would be the macro-cell in a collection of macro- and small cells. The location of the receiver is established using conventional GPS/GNSS methods and used as a first approximation of their own location. In many cases this approximation may be adequate. PTP provides a time synchronization between the receivers that is reasonably accurate with the principal source of error being the asymmetry.

At step 1103, equations, discussed above, are established based on pseudoranges between the Slave receivers and satellites estimated at distinct times or estimated by a plurality of the Slave receivers, and the equations are solved to estimate the time and location at each Slave receiver. Essentially this provides for better estimates of the time and location for the receiver that improve upon the initial estimate of step 1102.

At step 1104, each Slave receiver may output a signal reflective of the time and/or location estimated at that receiver. In turn, such time and location estimates may be used to support enhanced transmission formats and techniques which require tight synchronization between receivers in time/phase and frequency, emergency services such as the E-911 system, among other things.

After step 1104, the method 1100 returns to step 1103, where additional equations are established and used to solve for the time and location at the Slave receivers.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The invention claimed is:

1. A method comprising:
   estimating a first pseudorange as a time delay of a first signal received by a first receiver;
   receiving a second pseudorange estimated by a second receiver as a time delay of a second signal received by the second receiver, the first and the second receivers being at disparate geographical locations;
   detecting multipath corruption of the first signal received by the first receiver based on a difference between the first and the second estimated pseudoranges;
   determining at least one of a time offset of a clock of the first receiver or a location of the first receiver by solving a set of equations, wherein the set of equations are formulated based on a plurality of pseudoranges estimated using signals that are received by at least one of the first receiver or one or more other receivers and that are determined based on estimated pseudorange differentials to not be corrupted by multipath; and
   outputting a third signal reflective of the detected multipath corruption.

2. The method of claim 1, wherein detecting the multipath corruption includes determining that the difference between the first and the second estimated pseudoranges exceeds a threshold value.

3. The method of claim 2, wherein:
   the first and the second estimated pseudoranges are pseudoranges to a satellite from the first and the second receivers, respectively; and
   the threshold value is computed based on locations of the first and the second receivers and of the satellite.

4. A method comprising:
   estimating a first pseudorange as a time delay of a first signal received by a first receiver;
   receiving a second pseudorange estimated by a second receiver as a time delay of a second signal received by the second receiver, the first and the second receivers being at disparate geographical locations;
   detecting multipath corruption of the first signal received by the first receiver based on a difference between the first and the second estimated pseudoranges, wherein the detecting multipath corruption includes determining that the difference between the first and the second estimated pseudoranges exceeds a threshold value;
   determining that the first receiver has moved if differences between pseudoranges estimated by the first and the second receivers exceed the threshold value for more than a predefined time duration; and
   outputting a third signal reflective of the detected multipath corruption.

5. The method of claim 4, wherein the first and the second estimated pseudoranges are estimated at a same time by the first and the second receivers, respectively.

6. The method of claim 1,
   wherein the set of equations are formulated based on a plurality of pseudoranges estimated using signals that are received by at least one of the first receiver and the second receiver and that are determined based on estimated pseudorange differentials to not be corrupted by multipath.

7. The method of claim 1, wherein the determining at least one of the time offset of the clock of the first receiver or the location of the first receiver includes estimating an asymmetry of at least one network path.

8. The method of claim 1, wherein the first and the second receivers are synchronized using a Precision Timing Protocol (PTP) based technique.

9. The method of claim 1, wherein the first receiver is a small-cell receiver.

10. The method of claim 9, wherein the second receiver is a macro-cell receiver with an unobstructed view of the sky.

11. A receiver device, comprising:
    a memory; and
    a processing unit programmed to perform operations comprising:
      estimating a first pseudorange as a time delay of a first signal received by the receiver device,
      receiving a second pseudorange estimated by another receiver device as a time delay of a second signal received by the other receiver device, the receiver device and the other receiver device being at disparate geographical locations,
      detecting multipath corruption of the first signal received by the receiver device based on a difference between the first and the second estimated pseudoranges,
      determining at least one of a time offset of a clock of the receiver device or a location of the receiver device by solving a set of equations, wherein the set of equations are formulated based on a plurality of pseudoranges estimated using signals that are received by at least one of the receiver device or one or more other receiver devices and that are determined based on estimated pseudorange differentials to not be corrupted by multipath; and outputting a third signal reflective of the detected multipath corruption.

12. The receiver device of claim 11, wherein detecting the multipath corruption includes determining that the difference between the first and the second estimated pseudoranges exceeds a threshold value.

13. The receiver device of claim 12, wherein:
the first and the second estimated pseudoranges are pseudoranges to a satellite from the receiver device and the other receiver device, respectively; and
the threshold value is computed based on locations of the receiver device and the other receiver device and of the satellite.

14. A receiver device, comprising:
a memory; and
a processing unit programmed to perform operations comprising:
  estimating a first pseudorange as a time delay of a first signal received by the receiver device,
  receiving a second pseudorange estimated by another receiver device as a time delay of a second signal received by the other receiver device, the receiver device and the other receiver device being at disparate geographical locations,
  detecting multipath corruption of the first signal received by the receiver device based on a difference between the first and the second estimated pseudoranges, wherein the detecting multipath corruption includes determining that the difference between the first and the second estimated pseudoranges exceeds a threshold value,
  determining that the receiver device has moved if differences between pseudoranges estimated by the receiver device and the other receiver device exceed the threshold value for more than a predefined time duration, and
  outputting a third signal reflective of the detected multipath corruption.

15. The receiver device of claim 14, wherein the first and the second estimated pseudoranges are estimated at a same time by the receiver device and the other receiver device, respectively.

16. The receiver device of claim 11,
wherein the set of equations are formulated based on a plurality of pseudoranges estimated using signals that are received by the receiver device and that are determined based on estimated pseudorange differentials to not be corrupted by multipath.

17. The receiver device of claim 11, wherein the determining at least one of the time offset of the clock of the receiver device or the location of the receiver device includes estimating an asymmetry of at least one network path.

18. The receiver device of claim 11, wherein the receiver device and the other receiver device are synchronized using a Precision Timing Protocol (PTP) based technique.

19. The receiver device of claim 11, wherein:
the receiver device is a small-cell receiver; and
the other receiver device is a macro-cell receiver with an unobstructed view of the sky.

* * * * *